3,091,629
PREPARATION OF PHTHALONITRILES BY CATALYZED REACTION OF BENZONITRILE AND CYANOGEN
William L. Fierce, Crystal Lake, and Walter J. Sandner, Carpentersville, Ill., assignors to The Pure Oil Company, Chicago, Ill., a corporation of Ohio
No Drawing. Filed Sept. 7, 1960, Ser. No. 54,372
10 Claims. (Cl. 260—465)

This invention relates to new and useful improvements in processes for the preparation of phthalonitriles by reaction of benzonitrile with cyanogen at elevated temperatures in the presence of a noble-metal catalyst.

The phthalonitriles, viz., orthophthalonitrile, isophthalonitrile, and terephthalonitrile, are well known organic chemicals which are useful as intermediates in the preparation of a variety of organic compounds. The phthalonitriles are useful in the preparation of polyester and polyamide resins, and other organic compounds. Merz and Weith reported in Ber., 10, 753 (1877), that cyanogen and benzene react when passed through a hot tube (glowing faintly red) to form benzonitrile and terephthalonitrile in very small amounts, as well as small amounts of diphenyl. J. N. Cosby, in U.S. Patent 2,449,643, reports the production of benzonitrile by the high-temperature reaction of hydrogen cyanide with benzene or with diphenyl. In the Cosby patent, it is reported that mixtures of benzene or diphenyl and hydrogen cyanide react at temperatures in the range from 500° to 1100° C. Cosby reports that the reaction may be carried out in the presence or absence of catalysts and states that no provision need be made for catalyzing the reaction. In the absence of catalysts, it is stated that the reaction proceeds at adequate rates at temperatures above 750° C., although it is preferred to heat the reactants to temperatures of about 900°–950° C. Cosby indicates that in the presence of catalysts, lower temperatures may be employed, although no catalysts are disclosed as useful in this process. In our prior, copending applications Serial No. 854,561, filed November 23, 1959, now U.S. Patent 3,042,705, and Serial No. 768,072, filed October 20, 1958, now U.S. Patent 2,982,780, we have described novel processes for the preparation of benzonitrile and other aromatic nitriles by reaction of benzene, or other aromatic hydrocarbons, such as naphthalene and diphenyl, with hydrogen cyanide or cyanogen at elevated temperatures in the presence of a catalyst. In these processes, some very small amounts of phthalonitriles have been obtained. However, in spite of our best efforts at improving these processes, we have been unable to obtain any substantial improvement in the yield of phthalonitriles from the reaction of benzene with cyanogen or hydrogen cyanide in the presence of a catalyst.

It is therefore one object of this invention to provide a new and improved process for the preparation of phthalonitriles by high-temperature reaction of benzonitrile with cyanogen in the presence of a catalyst.

A feature of this invention is the provision of a process in which benzonitrile is mixed with cyanogen and heated to an elevated temperature in the presence of a catalyst consisting of a high-surface-area, refractory oxide support having deposited thereon a small amount of a group VIII noble metal.

A further feature of this invention is the provision of a process for the production of phthalonitriles by reaction of benzonitrile with cyanogen at temperatures in the range of about 400°–1000° C. in the presence of a catalyst consisting of a high-surface-area, refractory oxide, containing a small amount, e.g., 0.05–5.0% wt., based on the support, of a group VIII noble metal.

Other objects and features of this invention will become apparent from time to time throughout the specification and claims as hereinafter related.

This invention is based upon our discovery that phthalonitriles, including orthophthalonitrile, isophthalonitrile, and terephthalonitrile, are produced in enhanced yields by reaction of benzonitrile with cyanogen, at temperatures in the range from about 400°–1000° C, in contact with a catalyst consisting of a small amount of a group VIII noble metal (viz., platinum, palladium, iridium, ruthenium, osmium, and rhodium) on a refractory support. The catalyst support must be a high-surface-area, refractory oxide, such as activated alumina, silica gel, silica-alumina cracking catalyst, or the like, having a surface area in excess of 50 sq. m./g. The proportion of the group VIII noble metal in the catalyst is not critical and may vary widely, but for purposes of economy it is preferably in the range from about 0.05 to 5.0% wt. Within the temperature range of 400°–1000° C., cyanogen reacts with benzonitrile to produce mixture of phthalonitriles in much greater yields than are obtained in the absence of a catalyst or in the catalytic reaction of benzene with hydrogen cyanide or cyanogen. This process is limited to the catalyzed reaction of benzonitrile with cyanogen, since we have found benzonitrile does not react with hydrogen cyanide in the absence of catalysts to form phthalonitriles.

This reaction proceeds well at atmospheric pressure, although it may be carried out at either subatmospheric or superatmospheric pressures. At superatmospheric pressures, the reaction is more selective for the formation of phthalonitriles. In carrying out this reaction, the relative proportion of reactants is not critical and the ratio of reactants may vary from a large excess of one to a large excess of the other. Thus the preferred mol ratio of reactants is in the range from 0.1 to 10 mols of cyanogen per mol of benzonitrile. In carrying out this reaction, the velocity of reactants through the reaction zone is not critical and may vary through a wide range. Thus, the gaseous hourly space velocity of reactants may vary from as low as 50 to as high as 2000, or more, with a space velocity of 150–700 being preferred. In this process, the term "space velocity" refers to the ratio of the volume of the reactant gases (at standard temperature and pressure) charged per hour to the volume of the reaction space.

In carrying out this process, the benzonitrile and cyanogen may be premixed and preheated, or may be separately charged to the catalyst-containing reaction zone which is maintained at the desired reaction temperature. Any type of reactor may be used which is resistant to attack by the reactants or the reaction products. Thus, quartz, high-silica glass, stainless steel, and other refractory and corrosion-resistant materials may be used. The reactor may be heated by any suitable means, such as by combustion gases applied externally, by external or internal electric means, including resistance heaters and induction heaters, or by heating tubes extending through the reactor. Another method of heating which has been developed in recent years and which is particularly useful in this process is the use of hot refractory pebbles which are intermittently heated to the desired reaction temperature.

The product gases from the reaction zone consist of a mixture of phthalonitriles, unreacted cyanogen, and benzonitrile, by-product hydrogen cyanide, and unidentified by-product gases, probably including hydrogen and ammonia. These reaction gases are withdrawn from the reaction zone and cooled at a temperature sufficiently low to condense the product nitriles. The product which is condensed from the reaction gases will ordinarily have to be fractionated to obtain pure phthalonitriles, and the individual isomers will have to be separated by fractional crystallization, solvent extraction, or other techniques known in the art for separation of the individual phthalonitriles. The unreacted benzonitrile and cyanogen may be recycled to the reaction zone with additional quantities of the reactants for further reaction. In carrying out the experiments in which this invention was made, gas samples of the charge and product gases were analyzed by a mass spectrometer and liquid products were analyzed by infrared spectroscopy.

The following non-limiting examples are illustrative of the scope of this invention.

EXAMPLE I

In one experiment, cyanogen and helium were passed through a vertically-mounted, electrically-heated reaction tube of Vycor high-silica glass and benzonitrile was vaporized directly into the reactor. The reactor was charged with ceramic beads which have no known catalytic activity. The reactor tube was maintained at a temperature of 505° C. The cyanogen and benzonitrile were introduced at a cyanogen/benzonitrile mol ratio of 1.70 and a gaseous hourly space velocity of 286 for a period of 30 minutes. In this run, there was a 5.4% conversion of cyanogen and no conversion of benzonitrile. No detectable yield of phthalonitriles was obtained. In another run using the same apparatus, containing ceramic beads, the reaction of cyanogen with benzonitrile was attempted at a reaction temperature of 612° C. The cyanogen and benzonitrile were charged to the reactor at a cyanogen/benzonitrile mol ratio of 1.89 and a gaseous hourly space velocity of 278 for a period of 30 minutes. In this run, there was a 1.9% conversion of cyanogen and no conversion of benzonitrile. There was no detectable yield of phthalonitriles.

EXAMPLE II

In another series of experiments, using the apparatus of Example I, the reaction tube was filled with a catalyst consisting of activated alumina impregnated with 0.5% wt. rhodium. Cyanogen and benzonitrile, in a mol ratio of 2.84, were charged at a gaseous hourly space velocity of 669 to the reactor at a temperature of 400° C. In this run, there was a 2.6% conversion of cyanogen and a 14.5% conversion of benzonitrile. A mixture of phthalonitriles was obtained in a yield per pass of 0.9% based on benzonitrile which was the limiting reactant. The selectivity of the process under these conditions for formation of orthophthalonitrile was 1.9%, isophthalonitrile 1.9%, and terephthalonitrile 1.9%.

In another run, carried out at a cyanogen/benzonitrile mol ratio of 3.56, reaction temperature of 504° C., and gaseous hourly space velocity at 664 for a period of 30 minutes, there was a 10.2% conversion of cyanogen and a 23.9% conversion of benzonitrile. There was a yield of 3.6% orthophthalonitrile, 4.8% isophthalonitrile, and 1.6% terephthalonitrile per pass, based on benzonitrile charged. The selectivity for formation of the phthalonitriles was orthophthalonitrile 14.9%, isophthalonitrile 20.3%, and terephthalonitrile 6.8%. In still another run, carried out at 550° C., a cyanogen/benzonitrile mol ratio of 1.97, and a gaseous hourly space velocity of 292 for a period of 30 minutes, there was obtained a 61.6% conversion of cyanogen and a 51.6% conversion of benzonitrile. There was a yield per pass of 4.8% orthophthalonitrile, 8.6% isophthalonitrile, and 2.5% terephthalonitrile, based on benzonitrile charged. The selectivity for formation of the nitriles in this run was orthophthalonitrile 9.3%, isophthalonitrile 16.6%, and terephthalonitrile 4.8%.

In still another run, cyanogen and benzonitrile were charged in a mol ratio of 1.47 at a gaseous hourly space velocity of 328 for a period of 30 minutes to the reactor at a temperature of 660° C. Under these reaction conditions, there was a 62.3% conversion of cyanogen and a 49.7% conversion of benzonitrile. The yield per pass obtained in this run was orthophthalonitrile 3.1%, isophthalonitrile 4.3%, and terephthalonitrile 1.1%. The selectivity for the formation of the phthalonitriles was orthophthalonitrile 6.3%, isophthalonitrile 8.5%, and terephthalonitrile 2.2%.

EXAMPLE III

In another series of experiments, benzonitrile was heated with a palladium-containing catalyst to determine whether the phthalonitriles obtained in the reaction with cyanogen might originate in a disproportionation of benzonitrile to phthalonitriles and benzene. Two runs were carried out, using 25 cc. of a 0.48% wt. palladium on silica-alumina as catalyst, in which helium and liquid benzonitrile were charged to the reactor. The results are tabulated as follows:

*Table 1*

| Run No. | A | B |
| --- | --- | --- |
| Temperature (° C.) | 499–504 | 598–605 |
| Duration in Minutes | 40 | 40 |
| Helium Flow (cc./min.) | 50 | 50 |
| Benzonitrile Flow: | | |
| ml. Liquid Total | 10.7 | 10.0 |
| ml. Liquid Per Minute | 0.268 | 0.250 |
| cc. Gas Per Minute | 63.6 | 59.2 |
| Gaseous Hourly Space Velocity of Total Charge Gas | 273 | 262 |
| Liquid Product (ml.) | 10.2 | 9.2 |
| Solid Product | None | None |

The liquid products were analyzed by the infrared spectrophotometer. None of the phthalonitriles were detected. The liquids were principally benzonitrile, which had passed through the reactor essentially unchanged.

In carrying out the reaction of benzonitrile with cyanogen, we have found that catalysts consisting of a group VIII noble metal on a high-surface-area, refractory oxide promotes the formation of phthalonitriles in substantial yields. In the absence of a catalyst substantially no yield of phthalonitriles is obtained, even at extremely high reaction temperatures. When a high-surface-area, refractory oxide such as activated alumina is used alone as the catalyst, there is a very small yield of phthalonitriles. However, when a catalyst consisting of a group VIII noble metal on a high-surface-area, refractory oxide is used, it is possible to obtain substantial yields of phthalonitriles. This catalytic effect is present throughout the entire temperature range from about 400°–1000° C., although at temperatures above about 700° C., there are substantial losses due to the formation of decomposition products. The optimum temperature range for this process is from about 500° to 700° C. The catalysts which are effective in this process include any of the group VIII noble metals, i.e., rhodium, platinum, palladium, ruthenium, iridium, and osmium, either alone or in combination on a high-surface-area, refractory oxide support. Among the high-surface-area supports which may be used are refractory oxides, such as activated alumina, silica gel, silica-alumina cracking catalysts, and other high-surface-area, refractory, mixed-oxide gels. The term "high-surface-area" indicates a surface area in excess of about 50 sq. m./g. When catalysts are prepared for this reaction, it is preferred that the concentration of the group VIII noble metal on the refractory support be in the range from 0.05 to 5.0% wt., based on the support. This range of composition, however, is based largely upon economic considerations, and the amount of the noble metal on the catalyst support may vary extensively outside this range. Preferred catalyst compositions are 0.5% wt. rhodium on alumina, 0.5% wt. palladium on alumina, 0.5% wt. platinum on alumina, 0.5% wt. iridium on alumina, 0.5% wt. osmium on alumina, or 0.5% wt. ruthenium on alumina.

In carrying out this reaction, the proportion of reactants is not critical and may vary from 0.1 mol to 10 mols of cyanogen per mol of benzonitrile. However, an excess of cyanogen is preferred. The space velocity of the reactants may vary widely, e.g., from 50 to 2000, although space velocities of 150 to 750 are preferred. At very low feed rates, yields tend to be low due to decomposition of reactants arising from a high residence time in the reactor. Similarly, at very high space velocities, yields may be low due to an insufficient residence time in the reactor. Nevertheless, the space velocity is not critical and may be varied in a manner apparent to one skilled in the art. Because of the high temperatures at which this reaction is carried out, it is preferred that this process be operated at atmospheric or a very slight superatmospheric pressure, e.g., 15–20 p.s.i.a. Lower or higher pressures may be used, e.g., 5–500 p.s.i.a., but require additional safety precautions.

While we have described our invention fully and completely as required by the patent laws, with special emphasis upon several preferred embodiments, we wish it to be understood that within the scope of the appended claims, this invention may be practiced otherwise than as specifically described herein.

The embodiments of the invention in which an exclusive property or privilege is claimed are defined as follows:

1. A method of preparing phthalonitriles which comprises contacting a gaseous mixture consisting essentially of benzonitrile, and cyanogen, with a catalyst consisting essentially of 0.05–5.0% wt. of a group VIII noble metal on a high-surface-area, refractory oxide at a temperature of about 500°–700° C., sufficient to cause reaction between the benzonitrile and cyanogen, and recovering phthalonitriles from the reaction effluent.

2. A method according to claim 1 in which the mixture contains about 0.1–10 mols of cyanide compound per mol of benzonitrile.

3. A method according to claim 1 in which the gaseous mixture is circulated through a heated, catalyst-containing reaction zone at a gaseous hourly space velocity of about 50–2000.

4. A method according to claim 1 in which the reaction is carried out at a pressure of 5–500 p.s.i.a.

5. A method of preparing phthalonitriles which comprises contacting a gaseous mixture consisting of benzonitrile, an inert diluent gas, and cyanogen with a catalyst, consisting essentially of 0.05–5.0% wt. of a metal of the group consisting of rhodium, palladium, platinum, iridium, osmium, and ruthenium on activated alumina, at a temperature of 500°–700° C., and recovering phthalonitriles from the reaction effluent.

6. A method of preparing phthalonitriles which comprises contacting a gaseous mixture consisting of benzonitrile, an inert diluent gas, and cyanogen with a 0.05–5.0% wt. rhodium-on-activated alumina catalyst at a temperature of 500°–700° C., and recovering phthalonitriles from the reaction effluent.

7. A method of preparing phthalonitriles which comprises contacting a gaseous mixture consisting of benzonitrile, an inert diluent gas, and cyanogen with a 0.05–5.0% wt. palladium-on-activated alumina catalyst at a temperature of 500°–700° C., and recovering phthalonitriles from the reaction effluent.

8. A method of preparing phthalonitriles which comprises contacting a gaseous mixture consisting of benzonitrile, an inert diluent gas, and cyanogen with a 0.05–5.0% wt. platinum-on-activated alumina catalyst at a temperature of 500°–700° C., and recovering phthalonitriles from the reaction effluent.

9. A method of preparing phthalonitriles which comprises contacting a gaseous mixture consisting of benzonitrile, an inert diluent gas, and cyanogen with an 0.05–5.0% wt. iridium-on-activated alumina catalyst at a temperature of 500°–700° C., and recovering phthalonitriles from the reaction effluent.

10. A method of preparing phthalonitriles which comprises contacting a gaseous mixture consisting of benzonitrile, an inert diluent gas, and cyanogen with a 0.05–5.0% wt. ruthenium-on-activated alumina catalyst at a temperature of 500°–700° C., and recovering phthalonitriles from the reaction effluent.

References Cited in the file of this patent

UNITED STATES PATENTS

| | | |
|---|---|---|
| 2,758,129 | Jennings | Aug. 7, 1956 |
| 2,982,780 | Fierce et al. | May 2, 1961 |

OTHER REFERENCES

Janz: J.A.C.S., 74, 1954, pages 4529–4531.